J. J. COCHRANE.
EYEGLASS CLEANER.
APPLICATION FILED JAN. 31, 1913.
1,059,440.
Patented Apr. 22, 1913.
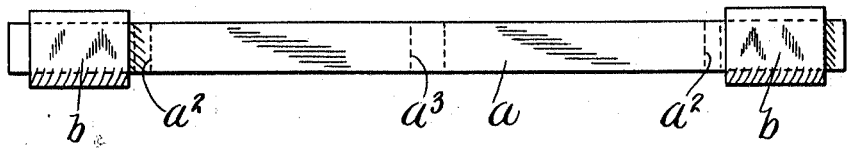
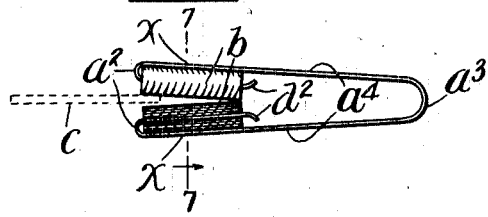
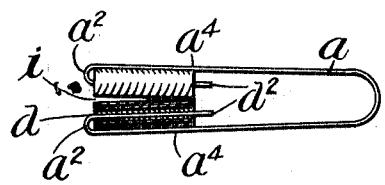
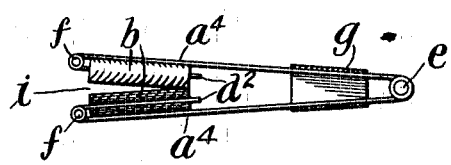
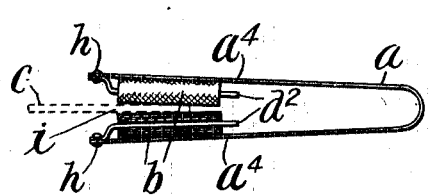
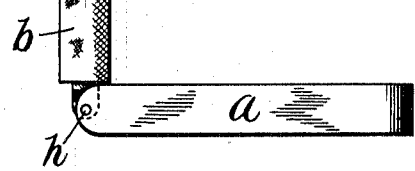
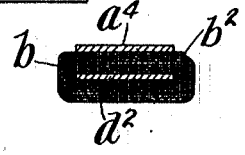
WITNESSES
INVENTOR
James J. Cochrane,
BY
ATTORNEYS.

UNITED STATES PATENT OFFICE.

JAMES J. COCHRANE, OF JERSEY CITY, NEW JERSEY.

EYEGLASS-CLEANER.

1,059,440.

Specification of Letters Patent.

Patented Apr. 22, 1913.

Application filed January 31, 1913. Serial No. 745,362.

*To all whom it may concern:*

Be it known that I, JAMES J. COCHRANE, a citizen of the United States, and residing at Jersey City, in the county of Hudson and State of New Jersey, have invented certain new and useful Improvements in Eyeglass-Cleaners, of which the following is a specification, such as will enable those skilled in the art to which it appertains to make and use the same.

This invention relates to devices for cleaning the lenses of eye glasses and spectacles, and the object thereof is to provide a device of this class which is simple in construction, efficient in use, and which is comparatively inexpensive, and by means of which the lenses of eye glasses or spectacles may be quickly and easily cleaned.

The invention is fully disclosed in the following specification of which the accompanying drawing forms a part, in which the separate parts of my invention are designated by suitable reference characters in each of the views, and in which:—

Figure 1 is a plan view of a strip of flexible metal and showing the first step in the manufacture of my improved eye glass cleaner, as shown in Figs. 1, 2 and 3;— Fig. 2 a side view of the cleaner complete with part of the construction in section;— Figs. 3, 4 and 5 views similar to Fig. 2, but showing modifications;—Fig. 6 a plan view of the device, as shown in Fig. 5, and showing one of the parts thereof in a different position, and;—Fig. 7 a partial section on the line 7—7 of Fig. 2 and showing more clearly the details of the construction.

In the practice of my invention, as shown in Figs. 1 and 2, I provide an oblong strip $a$ of flexible and spring material, preferably metal, and the opposite end portions of which are provided with cleaning pads $b$. These pads $b$ consist of strips of fibrous material preferably fine soft paper, or fine textile material which are wound onto the end portions of said strip and folded inwardly at $a^2$, after which the said strip is folded centrally at $a^3$. This operation produces the complete device, as shown in Fig. 2, and which consists of a U-shaped handle portion $a^4$ and the two pads $b$.

In the use of this device, the lens of a pair of spectacles or eye glasses is inserted between the pads $b$, as shown at $c$, and said pads are compressed on the opposite side portions of said lens by means of a thumb and finger placed thereon at $x$, and the cleaning device is moved transversely of the lens so as to press the pads $b$ into close contact therewith, and in this operation the lens is thoroughly cleaned on both sides.

If, at any time, the adjacent surfaces of the pads $b$ become soiled, all that is necessary is to remove the outer layer of the fibrous material of which said pads are composed, and said pads may be again used in the same way, and this operation may be repeated until the pads are entirely consumed.

In the construction shown in Fig. 3, the strip or strips of fibrous material from which the pads are formed are wound on sleeves $d$, and the sleeves, are then slipped onto the inwardly directed tongue members $d^2$ formed by folding the strip $a$ at $a^2$, and the sleeves $d$ may be held on said tongue members by friction or in any other way, and the operation of this form of construction will be the same as with that shown in Fig. 2.

In the construction shown in Fig. 4, the separate parts of the handle are hinged together at $e$, and the tongues $d^2$ are hinged at $f$, and a slide $g$ is mounted on the handle to hold all the parts in operative position. With this construction, the pads $b$ are wound on the tongue $d^2$ after which said tongues are swung inwardly and the separate parts of the handle pressed together, and the slide $g$ slipped thereonto, and the device is ready for use.

With the construction shown in Figs. 5 and 6, the tongues $d^2$ are pivoted to the ends of the handle portion at $h$ and said tongues may be swung outwardly, as shown in Fig. 5, for the purpose of winding the pads $b$ thereonto, after which they are swung into the position shown in Fig. 5, and the device is ready for use.

Fig. 7 of the accompanying drawing is intended to show the details of the structure of the pad or pads. In this view, $a^4$ represents one side portion of the handle and one of the tongues $d^2$ is shown, and in practice, the strip of fibrous material is wound on the tongue $d^2$ so as to form the pad $b$ with the free end $b^2$ of the strip held by the part $a^4$ of the handle. When the outer winding or thickness of the strip becomes dirty in use, it is pulled off and detached from the body of the pad at, or adjacent to the point $b^2$, and the end portions of the handle member may always be compressed so as to hold the succeeding layers of fibrous material in position after the outer layer is detached.

It will be understood that the pads $b$ may be made of any desired thickness and in the normal position of the parts as shown in Figs. 2 to 4 inclusive, the outer end portions of the pads are held slightly separated, as shown at $i$ so as to facilitate the insertion of the lens between said pads.

In all the forms of the construction shown the pads $b$ are on the inner side of the end portions of the handle members $a^4$, and in the use of the device as hereinbefore described, the thumb and finger are pressed on the said end portions of the handle members to force the pads together, and do not necessarily come in contact with said pads, but my invention is not limit. to the details of construction herein shown and described, and other changes therein and modifications thereof may be made, within the scope of the appended claims, without departing from the spirit of the invention or sacrificing its advantages.

Having fully described my invention what I claim as new and desire to secure by Letters Patent is:—

1. A device for cleaning eye glass lenses comprising a U-shaped handle member, the side portions of said handle member being provided at the ends thereof and on the inner side thereof with parts approximately parallel therewith, on which are wound pads of fibrous material.

2. A device for cleaning eye glass lenses comprising a U-shaped handle member the side portions of which are provided at the ends thereof and on the inner sides thereof with parts adapted to be moved into different positions, and on which are wound pads of fibrous material.

In testimony that I claim the foregoing as my invention I have signed my name in presence of the subscribing witnesses this 30th day of January 1913.

JAMES J. COCHRANE.

Witnesses:
C. MULREANY,
S. ANDREWS.